United States Patent
Shah et al.

(10) Patent No.: US 10,789,390 B1
(45) Date of Patent: Sep. 29, 2020

(54) SYSTEM AND METHOD FOR CONTROLLING ACCESS TO ACCOUNT TRANSACTION INFORMATION

(71) Applicant: Capital One Services, LLC, McLean, VA (US)

(72) Inventors: Salik Shah, Washington, DC (US); Sophie Bermudez, Washington, DC (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

(21) Appl. No.: 16/720,494

(22) Filed: Dec. 19, 2019

(51) Int. Cl.
*G06F 21/62* (2013.01)
*G06Q 40/00* (2012.01)

(52) U.S. Cl.
CPC ......... *G06F 21/6245* (2013.01); *G06Q 40/12* (2013.12)

(58) Field of Classification Search
CPC ..... G06F 21/6245; G06F 21/45; G06Q 40/12; G06Q 40/02; G06Q 20/425; H04L 9/32; H04L 9/3226; H04L 63/08
See application file for complete search history.

(56) References Cited

U.S. PATENT DOCUMENTS

| | | | |
|---|---|---|---|
| 2010/0070393 A1* | 3/2010 | Wells | G06Q 20/04 |
| | | | 705/30 |
| 2010/0121768 A1* | 5/2010 | Nambiar | G06Q 30/02 |
| | | | 705/80 |
| 2011/0082766 A1 | 4/2011 | Ko | |
| 2012/0197794 A1 | 8/2012 | Grigg et al. | |
| 2015/0052035 A1 | 2/2015 | Calman et al. | |
| 2017/0046679 A1* | 2/2017 | Gotlieb | G06Q 20/20 |
| 2017/0053286 A1* | 2/2017 | Bhagat | G06Q 20/40 |
| 2017/0186014 A1 | 6/2017 | Nowak et al. | |
| 2018/0365410 A1 | 12/2018 | Luo | |
| 2019/0259033 A1* | 8/2019 | Reddy | G06Q 20/4016 |

* cited by examiner

*Primary Examiner* — Amir Mehrmanesh
(74) *Attorney, Agent, or Firm* — Hunton Andrews Kurth LLP (57) ABSTRACT

In a method of controlling account user access to transaction information for a joint account, a set of control criteria is stored in a control database. Information for a new transaction is received and stored in a transaction information database. An information limitation request to prevent access to the transaction information by a second account user for a withholding time interval is received from a first account user. An access limitation record including identification of the second account user and the withholding time interval is stored in the information control database. Upon receiving from a second account user a request for account information including the transaction information, a determination may be made as to whether the transaction information should be withheld from the second account user. Responsive to a determination that the transaction information should be withheld, a response excluding the transaction information is transmitted to the second user device.

14 Claims, 5 Drawing Sheets

SYSTEM AND METHOD FOR CONTROLLING ACCESS TO ACCOUNT TRANSACTION INFORMATION

FIELD OF THE INVENTION

This disclosure relates generally to account security and transaction verification, and, more particularly, to temporarily limiting account holder access to designated account-related information in joint accounts.

BACKGROUND OF THE INVENTION

Financial account holders often wish to be kept abreast of transactions processed on their accounts and to review and assess various aspects of their account activity. This may be done for budget planning purposes or to assure there have been no unauthorized charges. Many accounts, however, are shared by multiple account holders who, as individuals, may not want all information on all transactions to be available to all of the other account holders. In some cases, a particular co-holder of an account may want to keep information for a particular purchase (e.g., a birthday or anniversary present) from another co-holder of the account for a limited time (e.g., until the birthday or anniversary). In many other cases, there may simply be a desire by one or more account co-holders for a screen of account information from one or more other account co-holders.

SUMMARY OF THE INVENTION

An illustrative aspect of the invention provides a method of controlling access to transaction information for a joint account having a plurality of account users. The method comprises associating, by an account information control processor, a set of information control criteria with the joint account and storing, by the account information control processor, the set of information control criteria in a transaction information control database. The method further comprises receiving, by a transaction monitoring processor from a transaction processing device via a network, transaction information for a new transaction conducted by a first account user of the plurality of account users. The transaction monitoring processor stores the transaction information in a transaction information database. The method still further comprises receiving, by the account information control processor from the first user device via the network, an information limitation request to prevent access to some or all of the transaction information by at least one other account user for a withholding time interval. The method also includes associating, by the account information control processor, an access limitation record with the transaction information. The access limitation record comprises an identification of the at least one other account user and the withholding time interval. The account information control processor stores the access limitation record in the transaction information control database. The method may further comprise receiving from a second user device associated with a second account user, an information request for account information including the transaction information and determining, using the access limitation record and the set of information control criteria, whether the transaction information should be withheld from the second account user. Responsive to a determination that the transaction information should be withheld a limited information request response excluding the transaction information is transmitted to the second user device. Responsive to a determination that the transaction information should not be withheld, a complete information request response including the transaction information is transmitted to the second user device.

Another aspect of the invention provides a system for controlling access to transaction information for a joint account having a plurality of account users. The system comprises a transaction information database, an account information control database, a transaction monitoring processor, and an account information control processor. The transaction information database has stored therein transaction information for a plurality of transactions associated with the joint account. The account information control database has stored therein information control criteria associated with the joint account. The transaction monitoring processor is in data communication with the transaction information database. The transaction monitoring processor is configured to receive, via a network, new transaction information for a new transaction involving a first account user of the plurality of account users. The new transaction information is received from at least one of the set consisting of a merchant device, a transaction processing server, and a first account holder device associated with the first account user. The new transaction information includes a plurality of new transaction characteristics. The transaction monitoring processor is further configured to store the new transaction information in the transaction information database. The account information control processor is in data communication with the transaction information database and the account information control database. The account information control processor is configured to receive from the first user device an information limitation request including identification of at least one new transaction characteristic to be withheld from at least one other account user for a withholding time interval. The account information control processor is configured to receive, from a second user device associated with a second account user of the plurality of account users, an information request for account information including the new transaction information. The control processor is also configured to determine whether some or all of the transaction information should be withheld from the second account user, and, responsive to a determination that some or all of the transaction information should be withheld, transmit to the second user device a limited information request response excluding the transaction information.

Another aspect of the invention provides an account holder interface device for controlling access to transaction information for a joint account having a plurality of account users. The device comprises a data processor, a communication interface, a user interface, and a memory. The communication interface is in communication with the data processor and is configured for selective communication with a transaction monitoring processor and an account information control processor via a network. The user interface comprises at least a user input device and a display. The memory is accessible by the data processor and has stored therein a first user identifier associated with a first account user of the joint account and contains a transaction information application with instructions to be carried out by the data processor. The transaction application is configured to receive, from the transaction monitoring processor via the network, a transaction notification comprising transaction information associated with a transaction on the joint account conducted by the first account user. The transaction information comprises a plurality of transaction characteristics. The transaction application is further configured to display, via the user interface display, the transaction notification and an option to limit access to the transaction information. The transaction application is further configured to receive, via the user input device, transaction limitation input including an identification of a second account user and at least one transaction characteristic to be withheld, and to transmit, to the account information control processor via the network, an information limitation request including the identification of a second account user and at least one transaction characteristic to be withheld from the second account user.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

While the invention will be described in connection with particular embodiments and manufacturing environments, it will be understood that the invention is not limited to these embodiments and environments. On the contrary, it is contemplated that various alternatives, modifications and equivalents are included within the spirit and scope of the invention as described.

The present invention provides methods of exercising control over the dissemination of transaction information to account holders. In particular, embodiments of the invention provide an account information control system that allows a co-holder of an account to exercise control over the availability of transaction information to other co-holders of the same account. In some embodiments, one co-holder may be designated as a primary account holder and can establish permanent restrictions on the ability of other co-holders to view certain account information. In other embodiments, co-holders of an account may agree to allow any co-holder to set temporary restrictions on access to certain transaction information.

Figure 1:
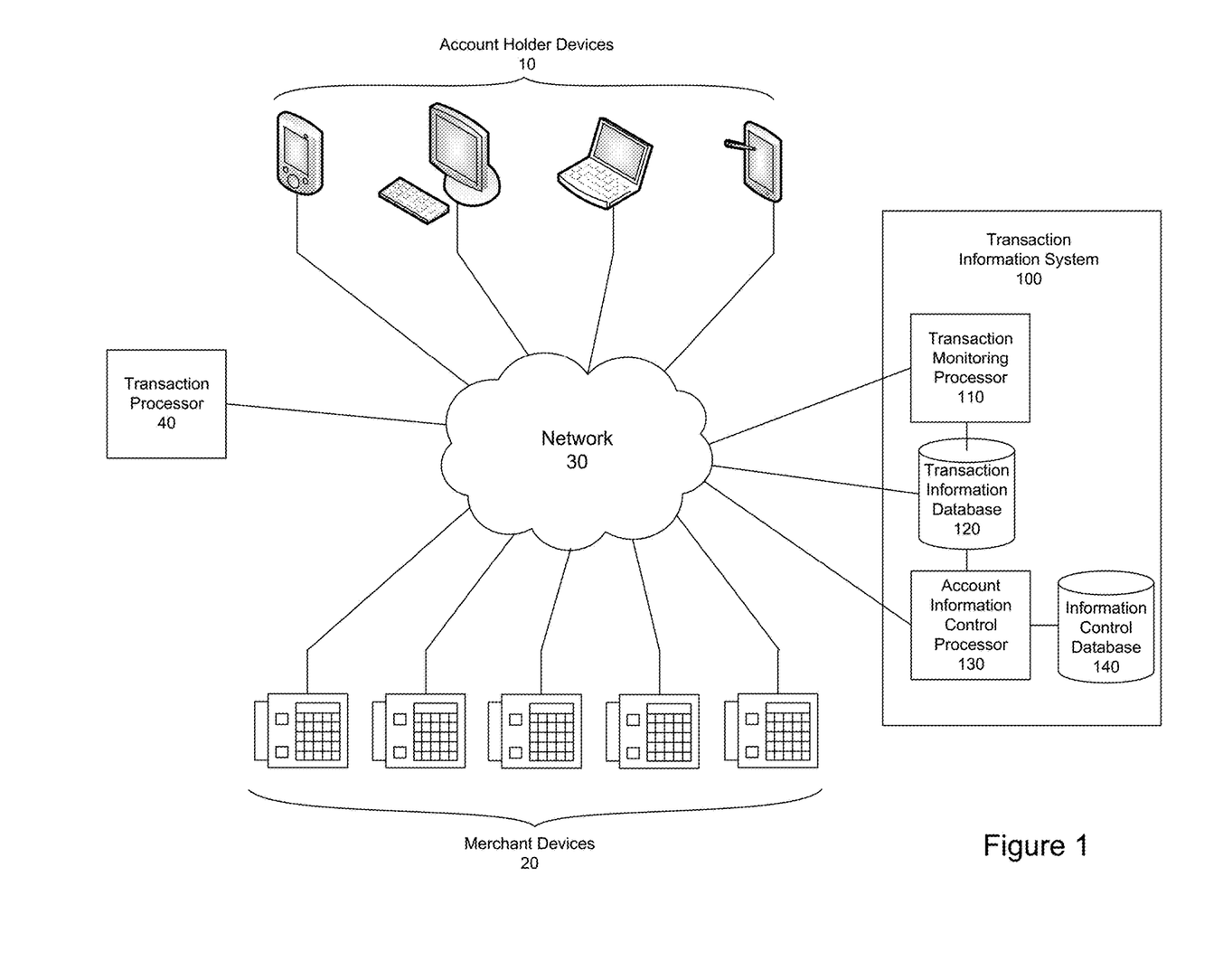
FIG. 1 is a schematic representation of a transaction information system according to an embodiment of the invention.

The methods of the invention can be implemented on or in conjunction with any transaction processing or monitoring system. FIG. 1 depicts a transaction information system 100 according to an embodiment of the invention. The system 100 may include various network-enabled computer systems, including, as depicted in FIG. 1 for example, a transaction monitoring processor 110 and an account information control processor 130. The transaction monitoring processor 110 is in communication with a transaction database 120. The transaction monitoring processor 110 may also be in communication with a plurality of account holder processing devices 10, a plurality of merchant transaction processing devices 20, and/or a transaction processor 40 via network 30 from any of which the transaction monitoring processor 110 can receive transaction information. In some embodiments, the transaction monitoring processor 110 and the transaction database 120 may communicate via the network 30. Alternatively, the transaction monitoring processor 110 and the transaction database 120 may communicate by another local or wide area network. In some embodiments, the transaction processor 40, the transaction database 120 and the transaction information system processor 110 may be connected by a network separate from the network 30.

As referred to herein, a network-enabled computer system and/or device may include, but is not limited to any computer device, or communications device including, a server, a network appliance, a personal computer (PC), a workstation, and a mobile processing device such as a smart phone, smart pad, handheld PC, or personal digital assistant (PDA). Mobile processing devices may include Near Field Communication (NFC) capabilities, which may allow for communication with other devices by touching them together or bringing them into close proximity.

The network-enabled computer systems used to carry out the transactions contemplated by the invention may execute one or more software applications to, for example, receive data as input from an entity accessing the network-enabled computer system, process received data, transmit data over a network, and receive data over a network. The one or more network-enabled computer systems may also include one or more software applications to notify an account holder based on transaction information. It will be understood that the depiction in FIG. 1 is an example only, and the functions and processes described herein may be performed by any number of network-enabled computers. It will also be understood that where the illustrated system 100 may have only a single instance of certain components, multiple instances of these components may be used. The system 100 may also include other devices not depicted in FIG. 1.

In the example embodiments presented herein, an account holder may be any individual or entity permitted to conduct a transaction (which may be, but is not limited to a financial transaction) using a transaction account. In a joint account (i.e., an account having multiple account holders), each account holder may be referred to as a "co-holder" of the account. An account may be held by any place, location, object, entity, or other mechanism for holding money or performing transactions in any form, including, without limitation, electronic form. An account may be, for example, a credit card account, a prepaid card account, stored value card account, debit card account, check card account, payroll card account, gift card account, prepaid credit card account, charge card account, checking account, rewards account, line of credit account, credit account, mobile device account, or mobile commerce account. An account holder may be a transaction processing entity such as a financial institution, credit card provider, or other entity that offers accounts to customers.

A transaction account may be associated with one or more transaction cards (e.g., debit cards, credit cards, or prepaid account cards). Alternatively or in addition, the transaction account may be associated with one or more account holder processing devices or simply associated with a unique identifier enterable by an account holder to facilitate a transaction. The processing devices may be configured to act as a method of payment at a POS location using, for example, NFC or any other mobile payment technology. In some embodiments, separate cards or user devices may be associated with individual account co-holders.

Figure 2:
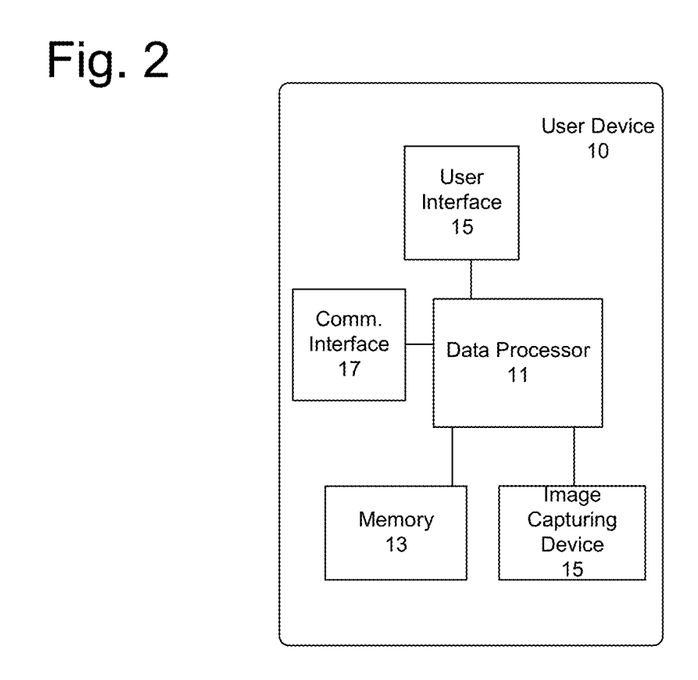
FIG. 2 is a schematic representation of a user processing device usable in conjunction with methods of the invention.

With reference to FIGS. 1 and 2, an account holder interface device 10 may be any data processing and/or communication device that an account holder uses to carry out a transaction and/or to receive notifications from the transaction processor 40 or the including, but not limited to a smartphone, a laptop, a desktop computer, and a tablet. In particular embodiments, the account holder device 10 includes an on-board data processor 11 in communication with a memory module 13, a user interface 15, and a communication interface 17. In some embodiments, the account holder device 10 may include an image capturing device 19 (e.g., a digital camera). The data processor 11 can include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 13 can be a read-only memory, write-once read-multiple memory or read/write memory, e.g., RAM, ROM and EEPROM, and the user device 10 can include one or more of these memories.

The user interface 15 includes a user input mechanism, which can be any device for entering information and instructions into the account holder device 10, such as a touch-screen, keyboard, mouse, cursor-control device, microphone, stylus, or digital camera. The user interface 15 may also include a display, which can be any type of device for presenting visual information such as a computer monitor, a flat panel display, and a mobile device screen, including liquid crystal displays, light-emitting diode displays, plasma panels, and cathode ray tube displays.

The communication interface 15 is configured to establish and support wired or wireless data communication capability for connecting the device 10 to the network 30 or other communication network. The communication interface 15 can also be configured to support communication with a short-range wireless communication interface, such as near field communication (NFC), radio-frequency identification, and Bluetooth, through communication interface 17, along with radio transmissions.

In embodiments of the invention, the memory 13 may have stored therein one or more applications usable by the data processor 11 to conduct and/or monitor transactions on a joint transaction account between the account holder device 10 and a merchant device 20 or other device over the network 30. These applications may include instructions usable by the data processor 11 to identify transaction events, store event data in the memory 13, and communicate event data to the transaction processor 40 and/or the transaction information system 100. Some applications may also include instructions relating to receiving and interpreting notifications and/or instructions from the transaction processor 40 or transaction information system 100.

In particular embodiments, the memory 13 may have stored therein an information control application configured for communicating account information control requests to the account information control processor 130. More specifically, the information control application may include instructions for receiving a transaction notification from the account information control processor 130 via the network 30 and the communication interface 17. The transaction notification may include information about a joint account transaction conducted by an account co-holder associated with the account holder device 10. This information may include one or more characteristics of the transaction. Such characteristics could include, but are not limited to, transaction type (e.g., purchase, payment, transfer, etc.), amount or amounts of money involved in the transaction, time and date information, merchant type and/or identification, bank identification, and merchandise or service type or identification. The application may include instructions to display some or all of the transaction information to the co-holder via the user interface 15. In some embodiments, these instructions may be conditional on the transaction information meeting predetermined criteria. For example, the transaction information might be displayed only if the transaction amount exceeds a certain value. The information control application may also include instructions to receive from the co-holder via the user interface 15 transaction limitation input including an identification of a second account co-holder (and, in some cases, additional co-holders) and at least one transaction characteristic to be withheld from the second account holder. In some embodiments, the transaction limitation input may also include a time interval through which the transaction characteristic should be withheld. The application may be configured to then construct and transmit to the information control processor 130 an information limitation request that includes the transaction limitation input. The application may be further configured to receive a request response from the information control processor 130, to prompt the co-holder for additional information if requested by the transaction control processor 130, receive such additional information via the user interface 15, and transmit the information to the transaction control processor. The application may also be configured to receive and display to the co-holder an access notification from the transaction control processor 130 indicating that the second account user has attempted to access the transaction information and/or that the second account holder has requested to override the information limitation request.

In some embodiments, the transaction notification may include information about a joint account transaction conducted by an account co-holder other than the one associated with the account holder device 10.

In some embodiments, the information control application may be configured to receive transaction limitation input from the co-holder and transmit to the transaction control processor 130 a transaction limitation request relating to prospective transactions having certain characteristics. Such a prospective request may specify a time period over which the prospective transactions may occur as well as time period for information access limitations to apply.

In some embodiments, the information control application may include instructions configured for constructing and transmitting a transaction information request to and receiving a response from the transaction control processor 130. The request may specify a particular transaction or one or more transactions having specified transaction characteristics. For example, the request may specify that information is sought on all account transactions carried out over a certain time period or with a certain merchant. The response from the transaction control processor 130 may include the requested transaction information. It may also or instead include a notification that some or all of the requested transaction information has been withheld due to a limitation placed on it by another co-holder of the account.

A merchant transaction processing device 20 may be any network enabled processor configured for processing a transaction with an account holder or co-holder. As used herein, a merchant is any entity with which an account holder carries out a transaction. This may include without limitation any retailer, wholesaler, or bartering entity. A merchant may have one or more physical locations or may be an online retailer. The merchant transaction processing device 20 may be any network enabled device (e.g., cash register or other POS terminal or an online transaction server) capable of carrying out the transaction and communicating with the transaction processor 40.

The network 30 may be any form of communication network capable of enabling communication between the transaction entities and the transaction information system 100. For example, the network 30 may be one or more of a wireless network, a wired network or any combination of wireless network and wired network. The network 30 may be or include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal. The network 30 may utilize one or more protocols of one or more network elements to which it is communicatively coupled. The network 30 may translate to or from other protocols to one or more protocols of network devices. Although the network 30 is depicted as a single network, it will be appreciated that it may comprise a plurality of interconnected networks, such as, for example, the Internet, a service provider's network, a cable television network, corporate networks, and home networks.

The transaction information database 120, which may be a relational database, is configured for storage and retrieval of transaction information associated with transactions between the co-holders of an account and any of a plurality of merchants. Transaction information may be received and stored in the transaction database 120 by the transaction processor 40 or by the transaction monitoring processor 110. Transaction information records may include any of various aspects of the transaction including an account identifier associated with the account holder's account, a merchant identifier, the subject matter of the transaction, the date and time of the transaction, and an amount of payment (or other monetary amount). The transaction information may also include location information, such as geographical information associated with the physical location where the transaction was conducted. If the transaction is carried out using an account holder's processing device, the transaction data may include information sufficient to identify the device and/or the location of the device at the time of the transaction. In some cases, the transaction data may include a goods category (e.g., clothing, electronics, restaurant, grocery store, hardware store, etc.) or even a specific item purchased or returned. In some embodiments, the transaction information database 120 may be a relational database and the transaction records stored therein configured to facilitate searching for transaction information based on user-supplied search criteria.

The transaction monitoring processor 110 is a network enabled processor or system in communication with the network 30 for communication with the transaction processor 40, the account holder devices 10, and/or the merchant devices 20. The transaction monitoring processor 110 is configured for receiving transaction information from the transaction processor 40, an account holder device 10 or a merchant device 20. Such information may be received during or after the completion of a transaction and me be filtered or otherwise processed by the transaction monitoring processor 110. In some embodiments, the transaction information processor 110 may be configured to receive information only for transactions meeting predetermined criteria or to limit storage of transaction information to transactions meeting such criteria.

The transaction information processing server 110 may be configured to parse raw transaction information and to identify various characteristics of the transaction. For each characteristic, the transaction information processing server 110 may identify predetermined categories and sub-categories into which the transaction characteristic falls. The monitoring processor 110 may be further configured to create a transaction information record for storage in the transaction database 120. In some embodiments, the monitoring processor 110 may be configured to create searchable records using the transaction information.

The account information control processor 130 is a network enabled processor or system connected to the network 30. The account information control processor 130 is configured for receiving requests for transaction information from and transmitting responses to account holder devices 10. Such communications may be conducted via individual transmissions or through an interactive communication session. In some embodiments, the account information control processor 130 may also be configured for transmitting transaction notifications to account holders. As will be discussed in more detail below, the account information control processor 130 is also configured for receiving requests to withhold transaction information.

According to various embodiments of the invention, the information control processor 130 is configured to review an information request and compare it to account information control criteria stored in an information control database 140. This allows the control processor 130 to determine whether transaction information should be provided in response to the request and, if so, whether any information should be withheld. The information control database 140 may include for each account a set of initial access permissions that allows different account holders different levels of access to information stored in the transaction information database 120. For example, some account holders may be limited to accessing information only for their own transactions, while others may view all transactions. Access limitation criteria may be based on any of the previously described transaction characteristics. In some cases, the same access limitations (or lack thereof) may apply to all account holders. Baseline access criteria may be established at the time of the creation of the account. In some embodiments, these may be changed later based on consensus of the account holders. In other embodiments, a primary account holder with control over the access criteria may be designated by consensus of the account holders.

The initial information access criteria may be applied to all transaction information and all information requests. The information control database 140, however, may also have stored therein temporary access limitations applicable to particular account holders and/or particular transaction information. As before, such limitations may be based on any transaction characteristics. The information for these limitations may, however, include a time limitation for the access restriction. This may be in the form of an end time and date indicator or in the form of a range of time over which the restriction is to be applied. The control database 140 may also include account-applicable rules for such temporary restrictions, including criteria under which such restrictions may be over-ruled or bypassed. These rules may also include limits on the length of time that a temporary restriction may be in place.

The information control processor 130 may be configured for receiving an information limitation request from an account holder user device 10. The information limitation request identifies the account and sets out the limitation or limitations the requester wishes to temporarily place. In particular, the request may identify a particular transaction and may identify one or more particular characteristics of that transaction that should be withheld from one or more account holders for a particular time frame. The information control processor 130 may initially authenticate the association of the user device 10 with the account and identify the particular account holder. The control processor 130 may be configured to then determine, based on criteria stored in the account information control database 140 whether the requesting account holder is authorized to request the restriction. If the requestor is authorized, the control processor 130 may store a temporary restriction record in the information control database 140. This record will include the restriction and a time limit or range. In some embodiments, the control processor 130 may be configured to remove the restriction record upon reaching the time limit or end of the specified range.

It will be understood that the transaction information control processor 130 may be configured to enact authorization or other security procedures before processing any transaction information request. Any security mechanism sufficient to assure that the account holder device 10 and/or the user are authorized to request transaction information for the account may be used.

The information control processor 130 is further configured to receive a transaction information request from a user device associated with the account. The information control processor 130 may initially authenticate the association of the user device 10 with the account and identify the particular account holder. The control processor 130 may be configured to then determine, based on criteria stored in the account information control database 140 whether the requesting account holder is authorized to receive the requested transaction information. This may be accomplished by applying the baseline access criteria and any temporary restrictions that may be applicable for the requesting account holder, the current time, and the transaction characteristics. If none of the restriction criteria are met, the information control processor 130 may retrieve the requested transaction information from the transaction information database 120 and transmit it to the requesting user device 10. If, however, either the baseline criteria or any temporary restriction criteria are met, the control processor 130 may retrieve only unrestricted transaction information from the information database 120. The control processor may be configured to then construct and transmit to the requesting user device 10 a response that includes only the unrestricted transaction information. In some embodiments, the response may identify the excluded information and provide an explanation for the exclusion. In some embodiments, the control processor 130 may be configured to, upon expiration of the restriction, transmit a notification to the requesting user device 10 indicating that the previously restricted information is now available.

The information control processor 130 may be still further configured to receive, from the requesting user device 10 a request to override an information restriction. The information control processor 130 may then determine, from information in the control database 140, whether the requester is authorized to override the restriction. If the requester is so-authorized, the information control processor may retrieve the restricted information from the transaction information database 120 and transmit it to the requesting user device 10. In some embodiments, the information control processor 130 may be configured to, under such circumstances, transmit a notification to one or more of the other account holders indicating that a restriction has been over-ridden. In cases where the restriction is a temporary restriction requested by an account holder, the notification may be limited to that account holder.

In some embodiments of the system 100, the transaction monitoring processor 110 or the transaction control processor 130 may be configured to transmit a transaction notification message to one or more of the account co-holders upon the processing of a transaction on the account. In some cases, such notifications may only be sent if the transaction meets certain criteria. Such criteria may include, for example, a minimum transaction amount. In such embodiments, the monitoring processor 110 or the control processor 130, as applicable, may be configured to verify that any such transaction notification or the information included therein does not meet any restriction criteria in the information control database 140. Responsive to a determination that the notification meets the restriction criteria, the notification may either not be transmitted or may be redacted to exclude the restricted information.

In some embodiments, the transaction monitoring processor 110 or the transaction control processor 130 may be configured to transmit a transaction notification only to the account holder identified as the person who carried out the transaction. In such embodiments, the transaction monitoring processor 110 or the transaction control processor 130 may be further configured to include in such notification an option to submit an information limitation request in relation to information for that transaction.

Figure 3A:
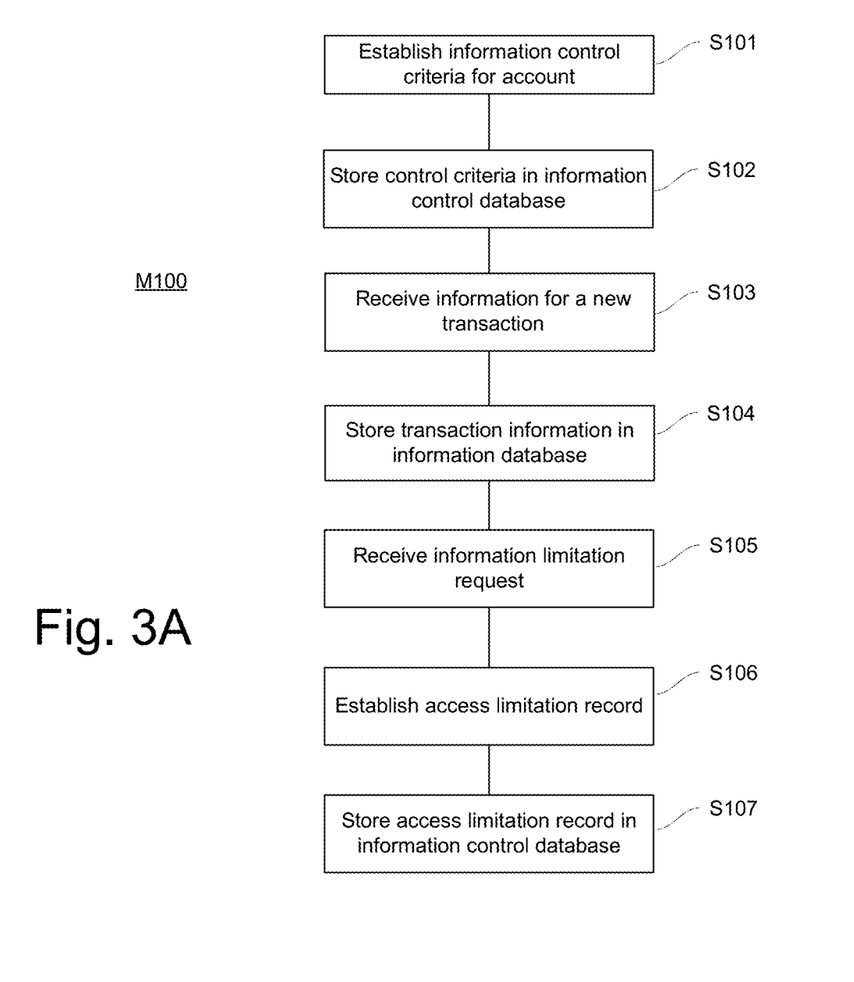
FIG. 3A is a flow chart of actions in a method of controlling access to transaction information for a joint account according to an embodiment of the invention.

With reference now to FIG. 3A, a method M100 of controlling access to transaction information for a joint account includes, at S101, establishing baseline information control criteria for and the account. This may include receiving information control criteria from the account co-holders and associating them with the account. Information control criteria may include individual permissions for each co-holder or uniform permissions for all co-holders. The criteria may include limitations relating to any transaction characteristic such as transaction type, value, merchant or merchant type, product or product type or. For example, a particular account co-holder may be allowed to view transaction information only for purchase transactions. Control criteria may also specify that a co-holder may only view transactions involving a particular subset of the account co-holders. For example, an account holder might be limited to viewing information relating to their own transactions.

At S102, a transaction information control processor stores the baseline control criteria in an information control database for future access and comparison to information requests. At S103, a transaction monitoring processor receives transaction information for a new transaction. This information may be received from a transaction processing system, a merchant processing system, or a user device associated with one of the account co-holders. The transaction information includes an identification of the account and/or account holder and one or more characteristics of the transaction. Transaction characteristics may include transaction type (e.g., purchase, payment, transfer, etc.), a monetary amount involved in the transaction, time and date information, merchant type and/or identification, bank identification, and merchandise or service type or identification. At S104, the transaction monitoring processor assembles a data record for the transaction and stores it in a transaction information database. In some embodiments, the transaction monitoring processor may transmit a transaction notification to one or more of the account co-holders. In particular embodiments, the monitoring processor may transmit such a notification solely to a user device (or devices) associated with the co-holder involved in the transaction.

At S105, the transaction information control processor receives an information limitation request from a first user device associated with one of the account co-holders. The information limitation request includes a set of information limitations the co-holder wishes to place on transaction information for the account. The limitations identify criteria for establishing information to be withheld as well as the account co-holders from whom it should be withheld. The request also specifies a time period over which the restriction would extend. In particular instances, the information limitation request relates to transaction for the new transaction and is received from the co-holder involved in that transaction. The information control processor may optionally verify authorization of the restriction requester to request the restriction by comparing the request information to predetermined authorization criteria stored in the information control database. At S106, the control processor mat establish a temporary access limitation record identifying the temporary restriction criteria and the time period for application of the restriction. At S107, the information control processor stores the access limitation record in the information control database.

Figure 3B:
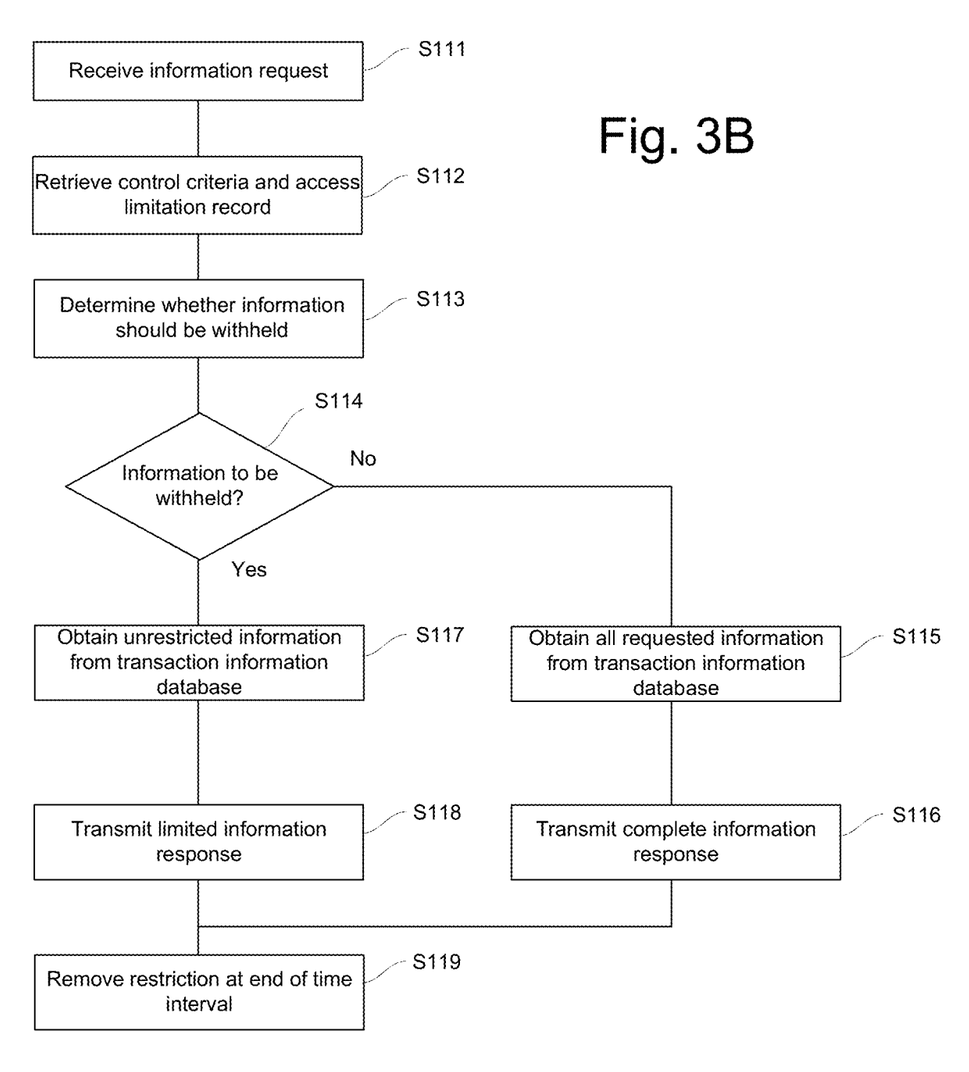
FIG. 3B is a flow chart of additional actions that may be included in the method of FIG. 3A.

With reference to FIG. 3B, the method M100 may further include receiving, by the transaction control processor at S111, a request for transaction information. This request may be received from a second user device associated with a second account co-holder. The request may include identification of the requesting user device and/or the second co-holder and identification of information from one or more transactions associated with the account. The transaction control processor may initially verify the association of the user device and/or co-holder with the account. The control processor may then, at S112, retrieve access control criteria from the information control database. These criteria may include both baseline control criteria and any active restriction criteria that has been requested and is in force. Based on these criteria and the information received in the transaction information request, the control processor determines at S113 whether information requested by the second co-holder should be withheld. If a determination is made that information should not be withheld, the method proceeds at S114 to access and provide the information. At S115, the transaction control processor obtains all requested information from the transaction information database and assembles a complete information request response. At S116, the control processor transmits the complete information request response to the second user device. If a determination is made that information should be withheld, the method proceeds at S114 to access and provide only that information that is not restricted. At S115, the transaction control processor obtains the unrestricted information from the transaction information database and assembles a limited information request response. It will be understood that, in some cases, none of the requested information will be unrestricted. In such cases, the limited information response will actually include no transaction information. In either case, the response may optionally include information explaining the exclusion of the restricted information. At S118, the control processor transmits the limited information request response to the second user device. The control processor may optionally transmit a notification to one or more other co-holders (or solely to the restriction requester) that restricted information has been requested. The method M100 may further include removing the restriction at the end of the time interval specified by the requester.

Figure 3C:
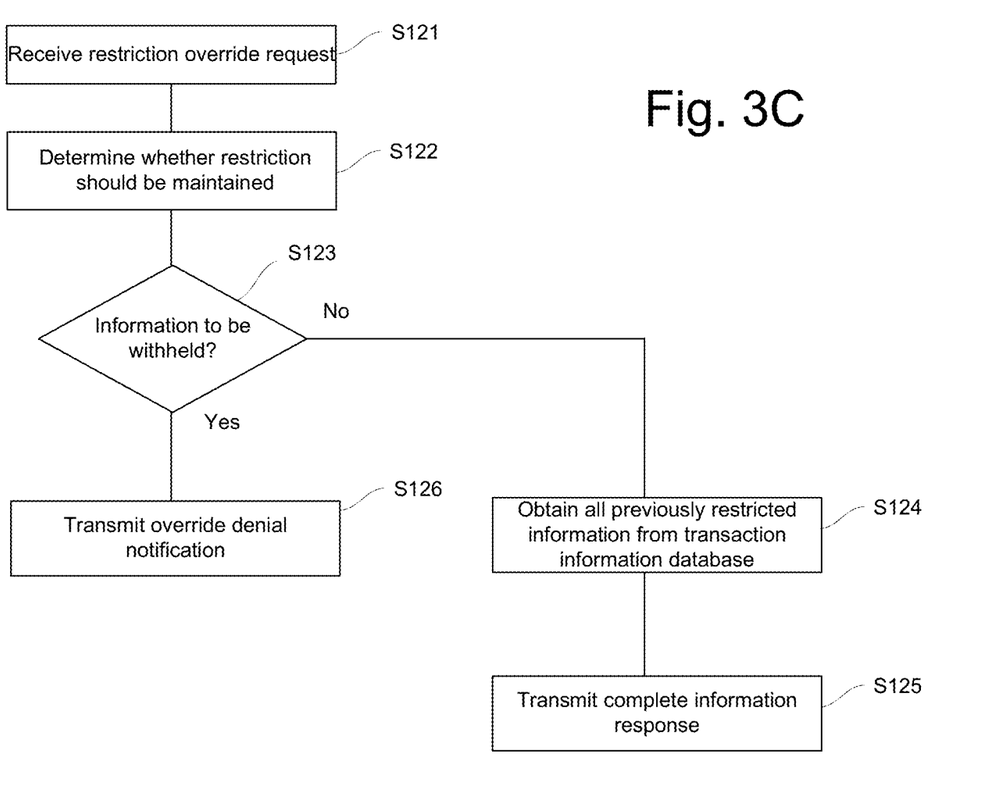
FIG. 3C is a flow chart of additional actions that may be included in the method of FIG. 3A.

With reference to FIG. 3C, the method M100 may also include actions for receiving and processing a restriction override request. At S121, a restriction override request may be received by the information control processor. This request may be received from the second user device in response to a limited information request response. In some embodiments, the override request may specify a basis for the request. In some cases, however, no additional criteria beyond the identity of the requester may be included. At S122, the information control processor determines whether the information restriction should be maintained. This may include using permission information from the information control database to verify that the requester is authorized to override the restriction and/or that any additional criteria are met. If a determination is made that information should no longer be withheld (i.e., that the restriction should be overridden), the method proceeds at S114 to access and provide the previously restricted information. At S124, the transaction control processor obtains all requested information from the transaction information database and assembles a complete information request response. Alternatively, the processor may construct the response using only the previously excluded information. At S125, the control processor transmits the complete information request response to the second user device. The control processor may also transmit a notification to the restriction requester (and/or other co-holders) indicating that the restriction has been overridden by the second co-holder. If a determination is made that information should be withheld, the method proceeds at S123 to assemble and transmit at S126 an override denial notification to the second user device.

The present invention provides a significant improvement in mechanisms for controlling access to information associated with an account. In particular, the present invention provides account holders a high degree of flexibility in determining their own access to transaction information based on the characteristics of the transaction. It also provides the ability to temporarily mask certain information from certain account holders while providing a mechanism for overriding such temporary measures.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A method of controlling access to transaction information for a joint account having a plurality of account users, the method comprising:
associating, by an account information control processor, a set of information control criteria with the joint account;
storing, by the account information control processor, the set of information control criteria in a transaction information control database;

receiving, by a transaction monitoring processor from a transaction processing device via a network, transaction information for a new transaction conducted by a first account user of the plurality of account users;

storing the transaction information in a transaction information database;

receiving, by the account information control processor from the first user device via the network, an information limitation request to prevent access to some or all of the transaction information by at least one other account user for a withholding time interval;

associating, by the account information control processor, an access limitation record with the transaction information, the access limitation record comprising an identification of the at least one other account user and the withholding time interval;

storing, by the account information control processor, the access limitation record in the account information control database;

receiving, by the account information control processor via the network from a second user device associated with a second account user of the plurality of account users, an information request for account information including the transaction information;

determining, by the account information control processor using the access limitation record and the set of information control criteria, whether the transaction information should be withheld from the second account user;

responsive to a determination that the transaction information should be withheld, transmitting, by the account information control processor to the second user device via the network, a limited information request response excluding the transaction information; and upon expiration of the withholding time interval,
  removing the access limitation record from the account information control database, and
  transmitting, by the account information control processor to the second user device, a notification that access to all account information has been restored.

2. A method according to claim 1 further comprising:
responsive to a determination that the transaction information should not be withheld, transmitting, by the account information control processor to the second user device via the network, a complete information request response including the transaction information.

3. A method according to claim 1 wherein the action of determining whether the transaction information should be withheld includes determining whether the information request is received during the withholding time interval.

4. A method according to claim 1 wherein the limited information request response includes an indication that access to account information has been withheld.

5. A method according to claim 1 further comprising:
subsequent to the action of transmitting a limited information request response,
  receiving, by the account information control processor from the second user device, an override request including override justification information;
  determining, by the account information control processor using the override justification information, whether the transaction information should be made available to the second account user;
  responsive to a determination that the transaction information should be made available to the second account user,
    transmitting, by the account information control processor to the second user device via the network, a complete information request response including the transaction information, and
    transmitting, by the account information control processor to the first user device via the network, an override notification indicating that the second account user has been granted access to the transaction information.

6. A method according to claim 5 wherein
the set of information control criteria includes override criteria for determining whether an account user should be granted access to withheld transaction information, and
the action of determining whether the transaction information should be made available includes comparing the override justification information to the override criteria.

7. A method according to claim 1 wherein the information limitation request specifies the withholding time interval.

8. A method according to claim 1 wherein the withholding time interval is included in the set of information control criteria.

9. A system for controlling access to transaction information for a joint account having a plurality of account users, the system comprising:
a transaction information database having stored therein transaction information for a plurality of transactions associated with the joint account;
an account information control database having stored therein information control criteria associated with the joint account;
a transaction monitoring processor in data communication with the transaction information database, the transaction monitoring processor being configured to
  receive, via a network, new transaction information for a new transaction involving a first account user of the plurality of account users, the new transaction information being received from at least one of the set consisting of a merchant device, a transaction processing server, and a first account holder device associated with the first account user, the new transaction information including a plurality of new transaction characteristics, and
  store the new transaction information in the transaction information database; and
an account information control processor in data communication with the transaction information database and the account information control database, the account information control processor being configured to
  receive from the first user device an information limitation request including identification of at least one new transaction characteristic to be withheld from at least one other account user for a withholding time interval,
  associate an access limitation record with the transaction information, the access limitation record comprising an identification of the at least one other account user and the withholding time interval,
  store the access limitation record in the account information control database,
  receive, from a second user device associated with a second account user of the plurality of account users, an information request for account information including the new transaction information, determine, using the access limitation record, whether some or all of the transaction information should be withheld from the second account user, and responsive to a determination that some or all of the transaction information should be withheld, transmit to the second user device a limited information request response excluding the transaction information, and upon expiration of the withholding time interval, transmit to the second user device, a notification that access to all account information has been restored and remove the access limitation record from the account information control database.

10. A system according to claim 9 wherein the transaction monitoring processor is further configured to transmit to the first user device a transaction notification including at least a portion of the new transaction information.

11. A system according to claim 10 wherein the transaction notification includes a notice of an option to submit the information limitation request.

12. A system according to claim 9 wherein the account information control processor is further configured to, as part of the action to determine whether the transaction information should be withheld from the second account user, retrieve the access limitation record from the account information control database, and determine if the second account user is included in the at least one other account user.

13. A system according to claim 9, wherein the information control criteria include override criteria for determining whether each account user should be allowed to override a request to withheld transaction information from such account holder, and wherein the account information control processor is further configured to, obtain the override criteria from the account information control database, and use the override criteria in the action to determine whether the transaction information should be withheld from the second account user.

14. A system according to claim 9 wherein the account information control processor is further configured to responsive to a determination that the transaction information should not be withheld, transmit a complete information request response including the transaction information.

* * * * *